(12) United States Patent
O'Brien

(10) Patent No.: US 11,148,198 B2
(45) Date of Patent: Oct. 19, 2021

(54) ALM BASE PLATE, SYSTEM AND METHOD

(71) Applicant: ROLLS-ROYCE plc, London (GB)

(72) Inventor: Stuart Benjamin O'Brien, Derby (GB)

(73) Assignee: Rolls-Royce plc

(*) Notice: Subject to any disclaimer, the term of this patent is extended or adjusted under 35 U.S.C. 154(b) by 616 days.

(21) Appl. No.: 15/963,128

(22) Filed: Apr. 26, 2018

(65) Prior Publication Data
US 2018/0311739 A1 Nov. 1, 2018

(30) Foreign Application Priority Data
Apr. 28, 2017 (GB) .................................. 1706804

(51) Int. Cl.
| | |
|---|---|
| B22F 5/00 | (2006.01) |
| B33Y 10/00 | (2015.01) |
| B22F 12/37 | (2021.01) |
| B22F 10/10 | (2021.01) |
| B29C 64/245 | (2017.01) |

(Continued)

(52) U.S. Cl.
CPC ............... B22F 5/00 (2013.01); B22F 5/009 (2013.01); B22F 12/00 (2021.01); B22F 12/37 (2021.01); B33Y 10/00 (2014.12); B33Y 30/00 (2014.12); B22F 10/10 (2021.01); B29C 64/245 (2017.08)

(58) Field of Classification Search
CPC .......... B22F 3/1055; B22F 5/00; B22F 12/30; B22F 12/33; B22F 12/37; B29C 64/241; B29C 64/245
See application file for complete search history.

(56) References Cited

U.S. PATENT DOCUMENTS

| | | | |
|---|---|---|---|
| 3,962,392 A | 6/1976 | Conner, Jr. | |
| 8,172,562 B2* | 5/2012 | Mattes | B33Y 30/00 425/174.4 |
| 2009/0020901 A1 | 1/2009 | Schillen et al. | |

(Continued)

FOREIGN PATENT DOCUMENTS

| | | |
|---|---|---|
| CN | 104908323 | 9/2015 |
| DE | 4102260 A1 | 7/1992 |
| EP | 3257609 A2 | 12/2017 |

OTHER PUBLICATIONS

Great Britain Search Report dated Nov. 15, 2017, issued in GB Patent Application No. 1706804.0.

(Continued)

*Primary Examiner* — Anthony J Zimmer
*Assistant Examiner* — Sean P. O'Keefe
(74) *Attorney, Agent, or Firm* — Barnes & Thornburg LLP

(57) ABSTRACT

The present disclosure relates to a system for forming an arcuate component by additive layer manufacturing (ALM). The system comprises a base plate for receiving a layer of powdered material and having opposing inner and outer transverse edges and an energy beam source for generating an energy beam for fusing a portion of the powdered material. The base plate is moveable away from the energy beam source from a first position to a vertically lower second position along an arcuate path such that the outer transverse edge traces an outer arc having a greater radius than an inner arc traced by the inner transverse edge. The present disclosure also relates to a base plate apparatus for use in ALM that is movable along an arcuate path and an ALM method using the base plate apparatus/system.

11 Claims, 1 Drawing Sheet

(51) Int. Cl.
    *B33Y 30/00*          (2015.01)
    *B22F 12/00*          (2021.01)

(56) References Cited

U.S. PATENT DOCUMENTS

| | | | |
|---|---|---|---|
| 2016/0067923 A1* | 3/2016 | James | B22F 3/1055 |
| | | | 264/497 |
| 2016/0096331 A1 | 4/2016 | Linnell et al. | |
| 2017/0165915 A1* | 6/2017 | Deng | B29C 64/106 |
| 2017/0232518 A1* | 8/2017 | Shi | B23K 26/0884 |
| | | | 419/7 |
| 2017/0252806 A1* | 9/2017 | Wienberg | B23K 26/342 |
| 2019/0124970 A1* | 5/2019 | Erbe | A23P 30/20 |

OTHER PUBLICATIONS

Extended EP Search Report completed by the EP Searching Authority dated Aug. 21, 2018 and issued in connection with EP Patent Application No. 18164561.5, 8 pages.

\* cited by examiner

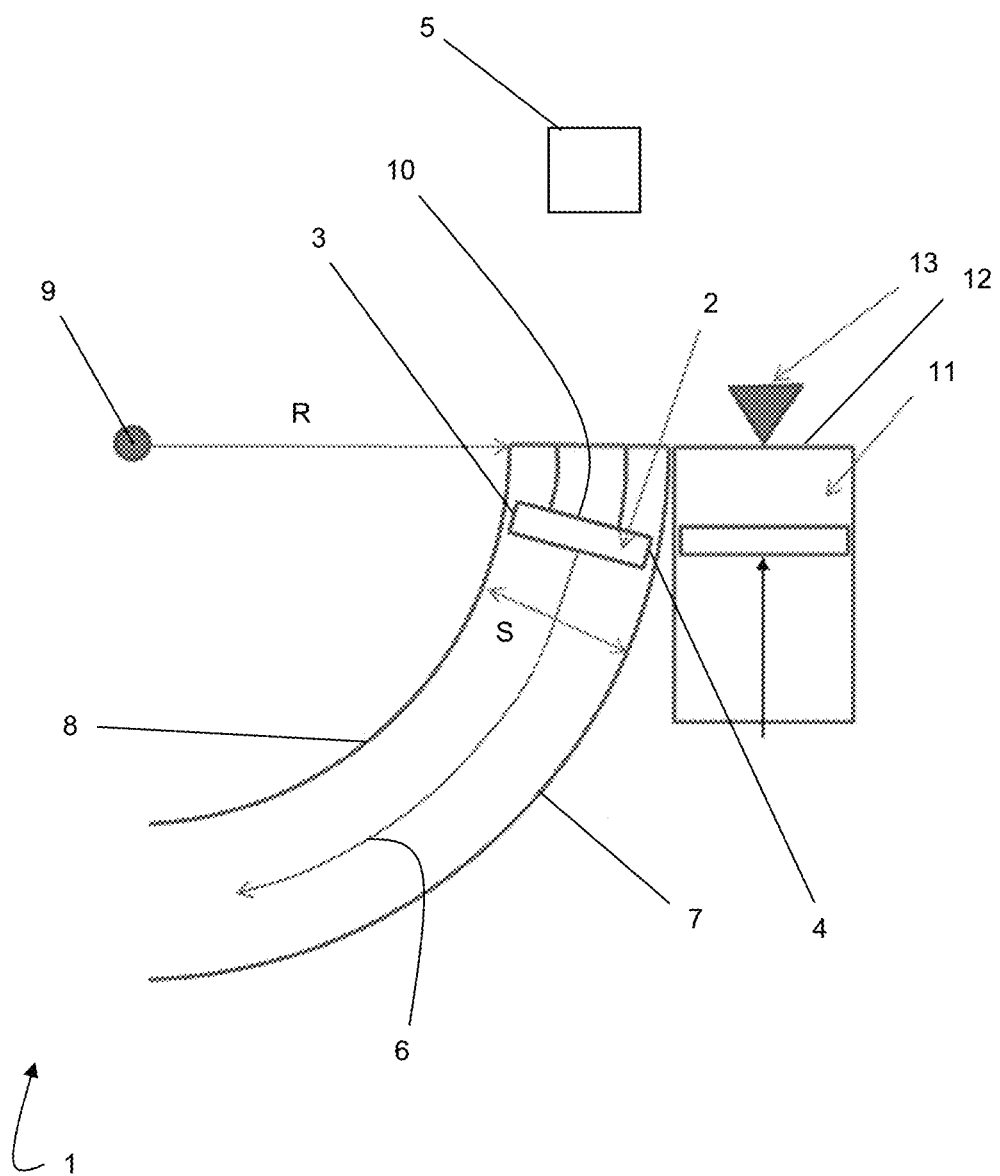

ALM BASE PLATE, SYSTEM AND METHOD

CROSS-REFERENCE TO RELATED APPLICATIONS

This application is based upon and claims the benefit of priority from British Patent Application No. GB 1706804.0, filed on 28 Apr. 2017, the entire contents of which are hereby incorporated by reference.

BACKGROUND

Field

The present disclosure relates to an apparatus and system for use in an additive layer manufacturing method and an additive layer manufacturing method using the apparatus/system. In particular, this disclosure relates to an apparatus, system and an additive layer manufacturing method for manufacturing an arcuate component.

Description of Related Art

In the aerospace industry, components manufactured by additive layer manufacturing (ALM) methods can have significant performance and weight advantages over components manufactured by more traditional methods.

Powder bed ALM methods construct components layer by layer by depositing powder on a machine bed or base/build plate and then selectively consolidating or fusing the powder using an energy beam such as a laser or an electron beam. The horizontal machine bed/base plate is then lowered vertically away from the energy beam source before the powder deposition/consolidation steps are repeated to produce a three dimensional component.

Some components manufactured using such ALM methods have an arcuate profile such as an annular or arciform profile. Such arcuate components can either be manufactured by growing the component layer upon layer in an axial direction or in a circumferential direction.

When grown in an axial direction, the build direction (away from the base plate) is aligned with the axial extension of the component and the radii/circumference of the arcuate component is in a plane parallel to the base plate.

Grain orientation in the consolidated material is important in determining mechanical properties of the component. When using an axial build direction to manufacture arcuate components, an axial grain orientation arises. This results in high angle columnar grain boundaries in the component which increases the likelihood of cracking.

When grown in a circumferential direction, the grain orientation varies around the circumference of the arcuate component making it difficult to predict and control mechanical properties.

Furthermore, using a circumferential build direction leads to an inherently unstable part-formed component on the base plate because the weight of the fused material is un-supported. Accordingly, support structures are required to provide stability and to reduce inherent residual stresses cause by distortion during manufacture. Such support structures are built up layer upon layer along with the component and consequently use a significant portion of the powdered material (often up to around 30%) and energy beam time. The support structures are subsequently removed from the component and disposed of.

There is a desire to provide an ALM apparatus, system and method that allows manufacture of an arcuate component whilst minimising the need for support structures and providing a grain structure which matches the stress/work load for the component in order to optimise mechanical properties.

SUMMARY

In a first aspect, there is provided a method for forming an arcuate component by additive layer manufacture, said method comprising: depositing a first layer of powdered material on a base plate in a first position; fusing a portion of the powdered material using an energy beam generated by an energy beam source; moving the base plate away from the energy beam source to a vertically lower second position; depositing a second layer of powdered material on the fused portion of material; and fusing a further portion of the powdered material using the energy beam, wherein moving the base plate from the first position to the second position comprises moving the base plate along an arcuate path such that an outer transverse edge of the base plate traces an outer arc having a greater radius than an inner arc traced by an opposing inner transverse edge of the base plate.

In a second aspect, there is provided an apparatus for forming an arcuate component by additive layer manufacturing, said apparatus comprising a base plate for receiving a layer of powdered material for subsequent fusing by an energy beam, and opposing inner and outer transverse edges, wherein said base plate is moveable along an arcuate path from a first position to a vertically lower second position such that the outer transverse edge traces an outer arc having a greater radius than an inner arc traced by the inner transverse edge.

In a third aspect, there is provided a system for forming an arcuate component by additive layer manufacturing, said system comprising: an apparatus according to the second aspect; and an energy beam source for generating an energy beam for fusing a portion of the powdered material, wherein the base plate is moveable away from the energy beam source from the first position to the vertically lower second position along the arcuate path.

By providing a base plate which is moveable (vertically lowerable) along an arcuate path to away from the energy beam source such that the outer transverse edge traces an outer arc having a greater radius than an inner arc traced by the inner transverse edge, it is possible to reduce the need for support structures since the weight of the fused material is better supported by the base plate. Furthermore, it is possible to optimise grain orientation and cause it to form in in the circumferential direction which matches the stress/work load for the component and thus provides improved mechanical properties.

Optional features will now be set out. These are applicable singly or in any combination with any aspect of the disclosure.

In order to lower the base plate along the arcuate path such that the outer transverse edge traces an outer arc having a greater radius than an inner arc traced by the inner transverse edge, the base plate pivots around a pivot point that is external to the base plate. The inner transverse edge of the base plate is interposed between the outer transverse edge and the pivot point. The centre points of the transverse edges are collinear with the pivot point. The pivotal axis is i.e. the axis through the pivot point about which the base plate rotates is parallel to the base plate (i.e. parallel to the major surface of the base plate (on which the first powder layer is deposited)).

In some embodiments, the spacing S between the inner and outer transverse edges of the base plate (i.e. the width of the base plate) is less than the radius R of the inner arc traced by the inner transverse edge as it moves from the first to the second position. In some embodiments, the ratio of the radius R of the inner arc to the spacing S between the inner and outer transverse edges is equal to or greater than 3 and may be around 4, for example.

As the base plate rotates i.e. moves along its arcuate path, the outer transverse edge moves a greater distance than the inner transverse edge. This means that in the second position, the outer transverse edge is lowered/spaced from the energy beam source by a greater vertical distance than the inner transverse edge i.e. the outer transverse edge is vertically lower than the inner transverse edge in the second position.

In some embodiments, the base plate is horizontal in the first position.

If the base plate is horizontal in the first position, it will be angled away from horizontal in the second position with the inner transverse edge being vertically higher than the outer transverse edge.

In some embodiments, the vertical spacing between the inner transverse edge and the outer transverse edge in the second position is between 1 and 50 microns e.g. between 1 and 40 microns, such as between 2 and 10 microns or between 3 and 7 microns e.g. around 4 microns.

Accordingly, when the second layer of powdered material is deposited on the fused portion of material, the second layer will have a first depth at the inner transverse edge and a second, greater depth at the outer transverse edge. The second depth may be up to 40% greater than the first depth e.g. between 10-20% greater.

In some embodiments, the base plate is movable sequentially from the second position to a plurality of further positions by moving/lowering the base plate further along the arcuate path such that the outer transverse edge of the base plate traces the outer arc having a greater radius than the inner arc traced by the opposing inner transverse edge of the base plate. In each position, a further layer of powdered material is deposited and subsequently fused using the energy beam in order to build up the arcuate component layer upon layer.

In some embodiments, the apparatus according to the second aspect incudes at least one arcuate guide rail for at least partly defining the arcuate path. In some embodiments, the system includes two arcuate guide rails defining the arcuate path, the first guide rail having a radius substantially matching the radius of the outer arc traced by the outer transverse edge and the second guide rail having a radius substantially matching the radius of the inner arc traced by the inner transverse edge.

The apparatus may further comprise an actuator for moving the base plate along the arcuate path e.g. between the guide rails.

In these embodiments, the method comprises moving the base plate from the first position to the second position within the first and second guide rails e.g. using the actuator.

In some embodiments of the third aspect, the system further comprises a powder source. The powder source may have a powder supply outlet horizontally and vertically aligned with the base plate in the first position. The method according to the first aspect may comprise depositing the first and second powder layer from the powder source e.g. by scraping powder from the powder supply outlet of a powder source e.g. using a powder scraper.

The method may comprise using a powder material formed of metal or metal alloy e.g. from nickel, copper, iron, steel, nickel alloys, titanium, titanium alloys, magnesium, magnesium alloys, aluminium, aluminium alloys, vanadium, zirconium, hafnium, or refractory metals such as niobium, molybdenum, tantalum, tungsten and rhenium. The powder material may be ceramic, metallic-ceramic combination or metal matrix composite e.g. from zirconium, yttria or silicon carbide.

In a fourth aspect, there is provided an arcuate component manufactured according to the first aspect.

In a fifth aspect, there is provided an arcuate component having a grain orientation that is aligned with the circumference of the arcuate component. The component may be a casing or a combustor component for a gas turbine engine.

BRIEF DESCRIPTION OF THE DRAWINGS

Embodiments will now be described by way of example with reference to the accompanying drawing in which:

FIG. 1 shows a side view of a system according to a first embodiment of the third aspect.

DETAILED DESCRIPTION

FIG. 1 shows a side view of a system 1 comprising a base plate 2 for receiving a layer of powdered material. The base plate 2 has an inner transverse edge 3 and an opposing outer transverse edge 4. The system further comprises an energy beam source 5 for generating an energy beam which may be a laser or an electron beam.

The base plate 2 is moveable away from the energy beam source 5 from a horizontal first position (not shown) to a vertically lower, non-horizontal second position (shown in FIG. 1) along an arcuate path 6 such that the outer transverse edge 4 traces an outer arc 7 (bound by a first guide rail) having a greater radius than an inner arc 8 (bound by a second guide rail) traced by the inner transverse edge 3.

As it moves along the arcuate path 6 (between the first and second guide rails), the base plate 2 pivots around a pivot point 9 that is external to the base plate 2. The inner transverse edge 3 of the base plate 2 is interposed between the outer transverse edge 4 and the pivot point 9. The centre points of the transverse edges (3, 4) are collinear with the pivot point 9. The pivotal axis is i.e. the axis through the pivot point 9 about which the base plate 2 rotates is parallel to the base plate 2 (i.e. parallel to the major surface 10 of the base plate 2).

The spacing S between the inner and outer transverse edges (3, 4) of the base plate 2 (i.e. the width of the base plate) is less than the radius R of the inner arc 8 traced by the inner transverse edge 4 as it moves from the first to the second position. The ratio of the radius R of the inner arc 8 to the spacing S between the inner and outer transverse edges (3, 4) is around 4.

As the base plate 2 rotates i.e. moves along its arcuate path 6 between the first and second guide rails, the outer transverse edge 4 moves a greater distance than the inner transverse edge 3. This means that in the second position (shown in FIG. 1), the outer transverse edge 4 is lowered/spaced from the energy beam source 5 by a greater vertical distance than the inner transverse edge 3 i.e. the outer transverse edge 4 is vertically lower than the inner transverse edge 3 in the second position shown in FIG. 1.

The vertical spacing between the inner transverse edge 3 and the outer transverse edge 4 in the second position around 4 microns.

The system further comprises a powder source 11 having a powder supply outlet 12 horizontally and vertically aligned with the base plate in the first position. The powder source 11 has a scraper 13 for scraping powder from a powder supply outlet 12 of the powder source onto the base plate 2 or onto the fused material on the base plate. The scraper 13 also levels the powder layer.

In an embodiment of the method according to the first aspect, the method comprises depositing a first layer of powdered material on the base plate 2 in a first horizontal position (not shown). The scraper 13 is used to scrape powder from the powder supply outlet 12 of the powder source 11 to form a horizontally levelled first layer of powder having a uniform depth. The powder material may be formed of metal or metal alloy, refractory metals, ceramic, metallic-ceramic combination or metal matrix composite.

A portion of the powdered material (having a profile matching the radial cross section of the arcuate component) is fused using an energy beam generated by the energy beam source 5. Next, the base plate 2 is moved i.e. vertically lowered to the second position shown in FIG. 1 along an arcuate path 6 (between the first and second guide rails) such that the outer transverse edge 4 of the base plate 2 traces the outer arc 7 having a greater radius than the inner arc 8 traced by the opposing inner transverse edge 3 of the base plate 2.

A second layer of powdered material is then deposited on the fused portion of material (using the scraper 13 to scrape powder from the powder source 11) and subsequently fused using the energy beam.

Because the base plate 2 is angled away from the horizontal in the second position with the inner transverse edge 3 being vertically higher (by 4 microns) than the outer transverse edge 4, the second layer of powder has a first depth (16 microns) at the inner transverse edge 3 and a second, greater depth (20 microns) at the outer transverse edge 4.

Once the portion of the second layer of powder material has been fused using the energy beam, the base plate 2 is moved sequentially from the second position to a plurality of further positions by moving/lowering the base plate 2 further along the arcuate path 6 (between the first and second guide rails) such that the outer transverse edge 4 of the base plate 2 traces the outer arc 7 having a greater radius than the inner arc 8 traced by the opposing inner transverse edge 3 of the base plate 2. In each position, a further layer of powdered material is deposited (from the powder source 11 using the scraper) and subsequently fused using the energy beam in order to build up the arcuate component layer upon layer.

As the arcuate component is built up layer upon layer, the weight of the fused material is supported by the base plate 2. The grain orientation (which directly opposes the direction of the energy beam) forms in in the circumferential direction which matches the stress/work load for the component and thus provides improved mechanical properties.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A method for forming an arcuate component by additive layer manufacture, said method comprising:
depositing a first layer of powdered material on a base plate in a first position;
fusing a portion of the powdered material using an energy beam generated by an energy beam source;
moving the base plate away from the energy beam source to a vertically lower second position;
depositing a second layer of powdered material on the fused portion of material; and fusing a further portion of the powdered material using the energy beam,
wherein moving the base plate from the first position to the second position comprises moving the base plate in an arcuate path along a first arcuate guide rail and a second arcuate guide rail such that an outer transverse edge of the base plate traces an outer arc having a greater radius than an inner arc traced by an opposing inner transverse edge of the base plate.

2. A method according to claim 1 wherein a spacing S between the inner and outer transverse edges of the base plate is less than the radius R of the inner arc traced by the inner transverse edge as it moves from the first to the second position.

3. A method according to claim 2 wherein the ratio of the radius R of the inner arc to the spacing S between the inner and outer transverse edges (R/S) is equal to or greater than 3.

4. A method according to claim 1 wherein the base plate is horizontal in the first position and angled away from horizontal in the second position with the inner transverse edge being vertically higher than the outer transverse edge.

5. A method according to claim 4 wherein the vertical spacing between the inner transverse edge and the outer transverse edge in the second position is between 1 and 50 microns.

6. A method according to claim 1 wherein depositing the second layer of powdered material comprises depositing a second layer having a first depth at the inner transverse edge and a second, greater depth at the outer transverse edge.

7. A method according to claim 6 wherein the second depth is up to 40% greater than the first depth.

8. A method according to claim 1 further comprising moving the base plate sequentially from the second position to a plurality of further positions by moving/lowering the base plate further along the arcuate path such that the outer transverse edge of the base plate traces the outer arc having a greater radius than the inner arc traced by the opposing inner transverse edge of the base plate.

9. A method according to claim 1 comprising depositing the first and second layer of powdered material by scraping powder from a powder supply outlet of a powder source.

10. A method according to claim 1 wherein the powder material is formed of metal or metal alloy, refractory metals, ceramic, metallic-ceramic combination or metal matrix composite.

11. The method of claim 1, wherein the arcuate path has the same degree of curvature as a first curve defined by the first guide rail and a second curve defined by the second guide rail, and wherein a longitudinal extent of the base plate that extends from the outer transverse edge of the base plate to the inner transverse edge of the base plate remains perpendicular to the arcuate path throughout an entirety of a movement of the base plate along the arcuate path.

* * * * *